United States Patent
Miyajima

(10) Patent No.: US 9,812,101 B1
(45) Date of Patent: Nov. 7, 2017

(54) CYMBAL ATTACHMENT AND HI-HAT STAND

(71) Applicant: HOSHINO GAKKI CO., LTD., Nagoya, Aichi (JP)

(72) Inventor: Hideyuki Miyajima, Nagoya (JP)

(73) Assignee: HOSHINO GAKKI CO., LTD., Nagoya (JP)

(*) Notice: Subject to any disclaimer, the term of this patent is extended or adjusted under 35 U.S.C. 154(b) by 0 days.

(21) Appl. No.: 15/333,097

(22) Filed: Oct. 24, 2016

(30) Foreign Application Priority Data

Jul. 4, 2016 (JP) ................................ 2016-132507

(51) Int. Cl.
  *G10D 13/02* (2006.01)
  *G10D 13/06* (2006.01)

(52) U.S. Cl.
  CPC ................................ *G10D 13/065* (2013.01)

(58) Field of Classification Search
  USPC ....................................................... 84/422.3
  See application file for complete search history.

(56) References Cited

U.S. PATENT DOCUMENTS

| | | | | |
|---|---|---|---|---|
| 5,482,235 A | * | 1/1996 | Atsumi | F16L 3/08 248/121 |
| 5,808,217 A | * | 9/1998 | Liao | G10D 13/065 248/121 |
| 6,011,209 A | * | 1/2000 | Liao | G10D 13/065 84/422.1 |
| 7,629,526 B1 | * | 12/2009 | Miyajima | G10D 13/06 84/422.1 |
| 8,471,133 B1 | * | 6/2013 | Lin | G10D 13/06 84/421 |
| 8,865,988 B2 | * | 10/2014 | Nakata | G10D 13/06 84/422.3 |
| 9,343,049 B1 | * | 5/2016 | Spriggel | G10D 13/06 |
| 2014/0096665 A1 | | 4/2014 | Nakata et al. | |
| 2016/0284328 A1 | * | 9/2016 | Sera | G10D 13/065 |

FOREIGN PATENT DOCUMENTS

JP     2014-077864 A     5/2014

* cited by examiner

*Primary Examiner* — Christopher Uhlir

(57) ABSTRACT

A cymbal attachment includes an attachment body having a fixing hole to which a rod is fixed and a stopper assembly adapted to be mounted onto the attachment body. The stopper assembly includes a stopper holder and a stopper slider, which is accommodated in the stopper holder. The stopper slider has a round hole and a continuous hole, which is located above the round hole. An engagement surface by which the stopper slider is engaged with the attachment body is arranged in both the attachment body and the stopper slider.

11 Claims, 11 Drawing Sheets

CYMBAL ATTACHMENT AND HI-HAT STAND

BACKGROUND OF THE INVENTION

The present invention relates to a cymbal attachment and a hi-hat stand.

A hi-hat stand includes a stand body, a foot pedal, and a rod, which is selectively lifted and lowered by depressing the foot pedal. A hi-hat is configured by a bottom cymbal supported by an upper end of the stand body and a top cymbal attached to an upper end of the rod. The hi-hat is played by manipulating the foot pedal to selectively lift and lower the top cymbal together with the rod, thus causing the top cymbal to contact and separate from the bottom cymbal correspondingly. At this time, the top cymbal is repeatedly lifted and lowered together with the rod and vibrated to a great extent through contact with the bottom cymbal. It is thus demanded that a cymbal attachment have not only a function of attaching the cymbal to the rod but also a function of maintaining a desirable attachment state of the cymbal even when the cymbal is played.

A cymbal attachment disclosed in Japanese Laid-Open Patent Publication No. 2014-77864 includes a hollow bolt fixed to a rod and a pair of fastening tools, which clamp a cymbal and are threaded onto the hollow bolt. Each of the fastening tools includes a body, a manipulating member movable in the body, and an elastic member, which urges the manipulating member in a certain direction. A pair of elongated grooves, which are engaged with stopping pieces projecting from the manipulating member, is formed in a peripheral surface of the hollow bolt. To attach a cymbal to the cymbal attachment, the hollow bolt is passed through a central hole of the cymbal with a lower one of the fastening tools detached from the cymbal attachment. Then, the lower fastening tool is prepared and the manipulating member is pressed and, in this state, threaded onto the hollow bolt. Further, while manually rotating the manipulating member, the manipulating member is fastened to the hollow bolt. If the manipulating member is released from pressing, the urging force of the elastic member causes the stopping pieces of the manipulating member to become engaged with the elongated grooves of the hollow bolt by the time the fastening tool completes one cycle of rotation. This restricts further rotation of the fastening tool such that the fastening tool doesn't become loose from the state fastened to the hollow bolt.

A cymbal attachment disclosed in U.S. Pat. No. 8,471,133 includes a body, a movable member and an elastic member that are accommodated in space in the body, and a restriction pin extending through the body and the movable body. The elastic member urges the movable member in such a direction that the movable member is pressed from the interior of the body to the exterior. A longitudinal hole, through which a rod is inserted, is formed in both the body and the movable member. An internal thread, onto which an external thread of the rod is threaded, is formed in the longitudinal hole of the movable member. In this configuration, when the movable member is pressed out from the interior of the body by the urging force of the elastic member, the internal thread of the movable member and the external thread of the rod become engaged with each other. The cymbal attachment is thus attached to the rod. Then, the restriction pin is moved in a certain direction to restrict movement of the movable member in the body. The internal thread of the movable member and the external thread of the rod are thus maintained in engagement.

As described in Japanese Laid-Open Patent Publication No. 2014-77864, to detach the cymbal from the cymbal attachment, the manipulating member must be pressed against the urging force of the elastic member to disengage the stopping pieces of the manipulating member from the elongated grooves of the hollow bolt, like when attaching the cymbal. Further, while pressing the manipulating member, the fastening tool must be rotated until the fastening tool is separated from the hollow bolt. Such work is complicated and troublesome for the user. In contrast, the cymbal attachment disclosed in U.S. Pat. No. 8,471,133 is easily attached to the rod while pressing the movable member. In this cymbal attachment, engagement between the internal thread of the movable member and the external thread of the rod is maintained by the restriction pin. The cymbal attachment, however, may cause the threads to become loose when the cymbal is played and thus repeatedly lifted and lowered and vibrates to a great extent. As such loosening of the threads of the cymbal attachment advances, it may become impossible to maintain a desirable attachment state of the cymbal.

SUMMARY OF THE INVENTION

Accordingly, it is an objective of the present invention to provide a cymbal attachment and a hi-hat stand that facilitate attachment and detachment of a cymbal and maintain the cymbal in a desirable attachment state even when the cymbal is played.

According to a first aspect of the present invention, to solve the above-described problems, provided is a cymbal attachment adapted to attach a cymbal to a rod. The cymbal attachment includes an attachment body having a fixing hole to which the rod is fixed and a stopper adapted to be mounted onto the attachment body to attach the cymbal to the attachment body. The stopper has a rod insertion recess through which the rod is inserted. An engagement surface by which the stopper is engaged with the attachment body by sliding the stopper in the direction perpendicular to the axis of the fixing hole is arranged in both the attachment body and the stopper. In a state in which the stopper is engaged with the attachment body, the rod inserted through the rod insertion recess restricts sliding of the stopper.

According to a second aspect of the invention, to solve the above-described problems, provided is a hi-hat stand including a stand body, a foot pedal manipulated to play a cymbal, a rod that is selectively lifted and lowered by depressing the foot pedal, and a cymbal attachment adapted to attach the cymbal to the rod. The cymbal attachment includes an attachment body having a fixing hole to which the rod is fixed and a stopper adapted to be mounted onto the attachment body to attach the cymbal to the attachment body. The stopper has a rod insertion recess through which the rod is inserted. An engagement surface by which the stopper is engaged with the attachment body by sliding the stopper in the direction perpendicular to the axis of the fixing hole is arranged in both the attachment body and the stopper. In a state in which the stopper is engaged with the attachment body, the rod inserted through the rod insertion recess restricts sliding of the stopper.

DETAILED DESCRIPTION OF THE PREFERRED EMBODIMENTS

An embodiment of a cymbal attachment and a hi-hat stand according to the present invention will now be described with reference to FIGS. 1 to 8B.

Figure 1:
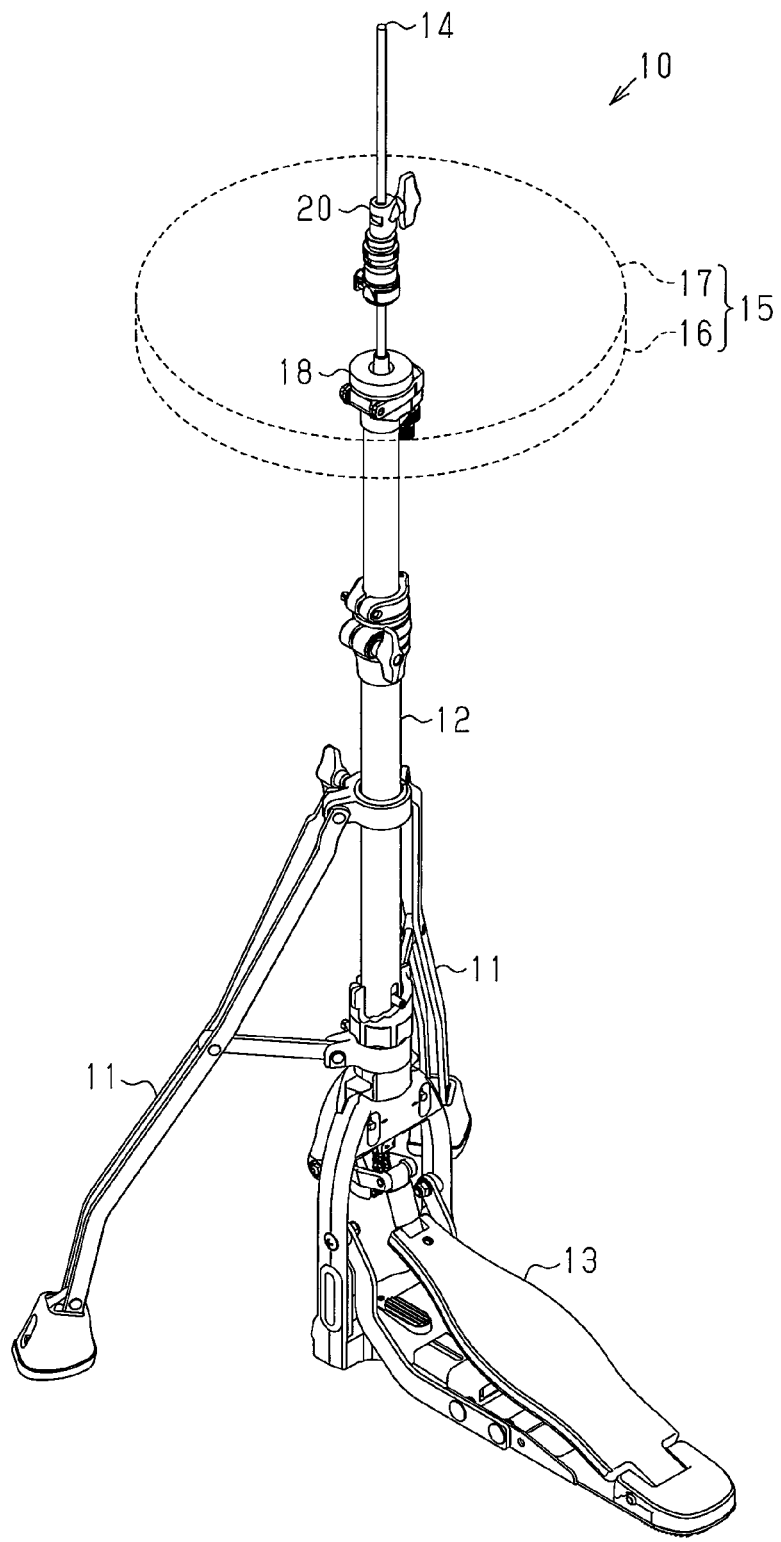
FIG. 1 is a perspective view showing a hi-hat stand according to an embodiment of the present invention.

As shown in FIG. 1, a hi-hat stand 10 includes a stand body 12 having leg portions 11, a foot pedal 13 fixed to a lower end of the stand body 12, and a rod 14 inserted through the stand body 12. The rod 14 is moved in the up-down direction by depressing the foot pedal 13. A hi-hat 15 is attached to an upper end of the hi-hat stand 10. The hi-hat 15 is configured by a bottom cymbal 16 and a top cymbal 17. The bottom cymbal 16 is supported by an upper end of the stand body 12 through a support tool 18. The top cymbal 17 is attached at a position in the vicinity of an upper end of the rod 14 using a cymbal attachment 20.

Figure 2:
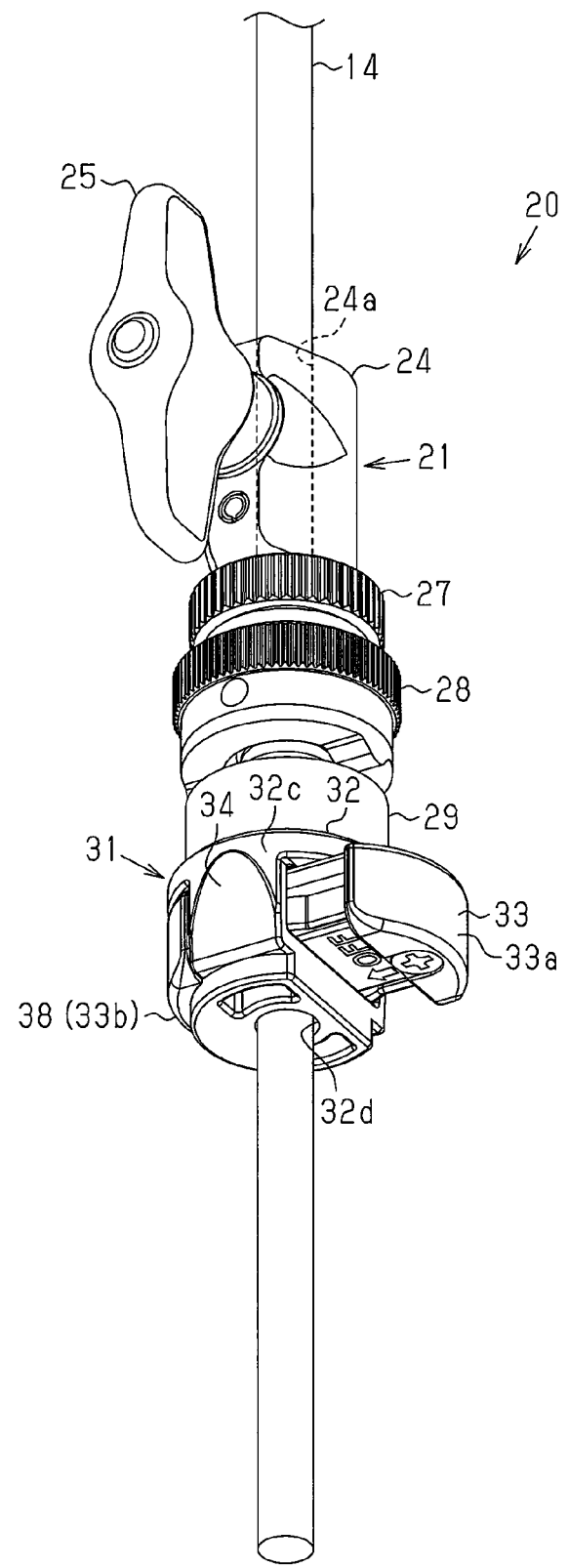
FIG. 2 is a perspective view showing a cymbal attachment according to the embodiment of the invention.
Figure 3:
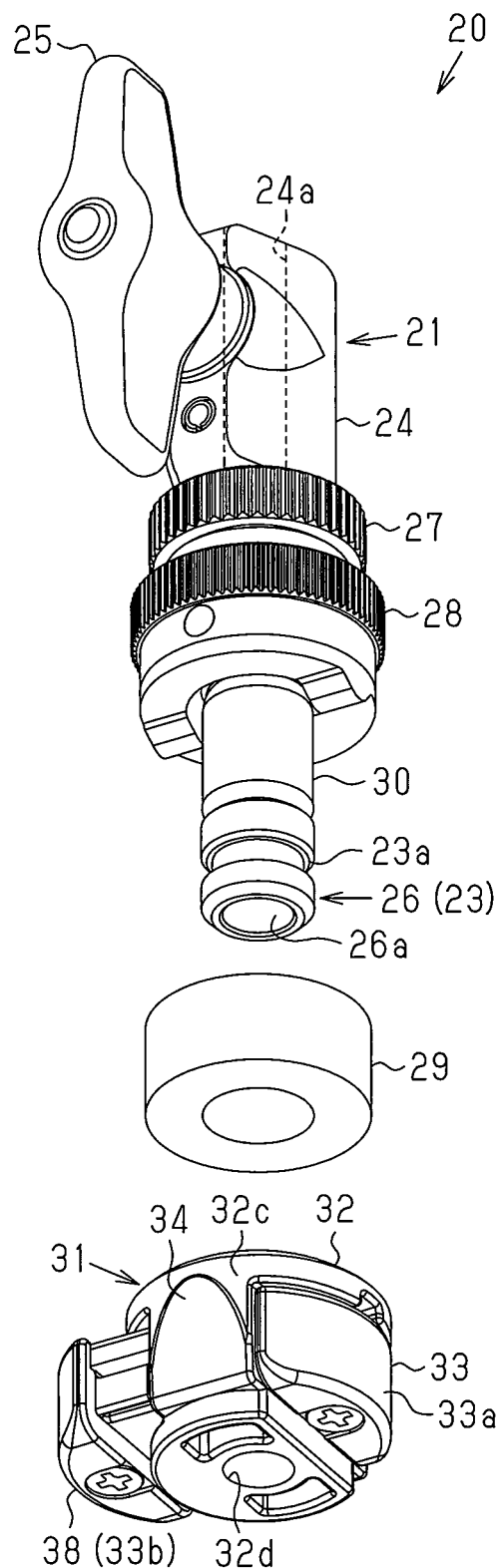
FIG. 3 is a perspective view showing the cymbal attachment in a state disassembled into an attachment body and a stopper assembly.
Figure 5:
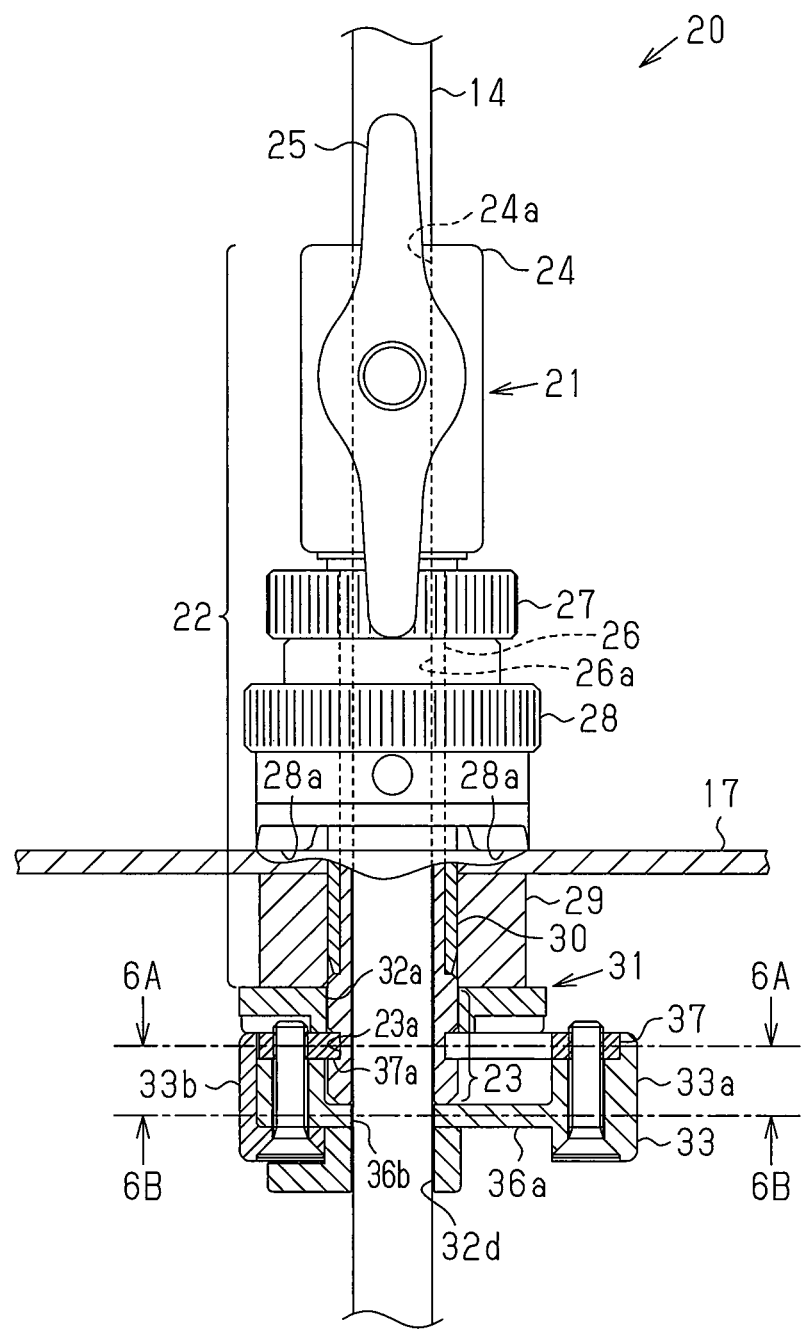
FIG. 5 is a partial cross-sectional view illustrating an engagement state of the cymbal attachment.
Figure 7:
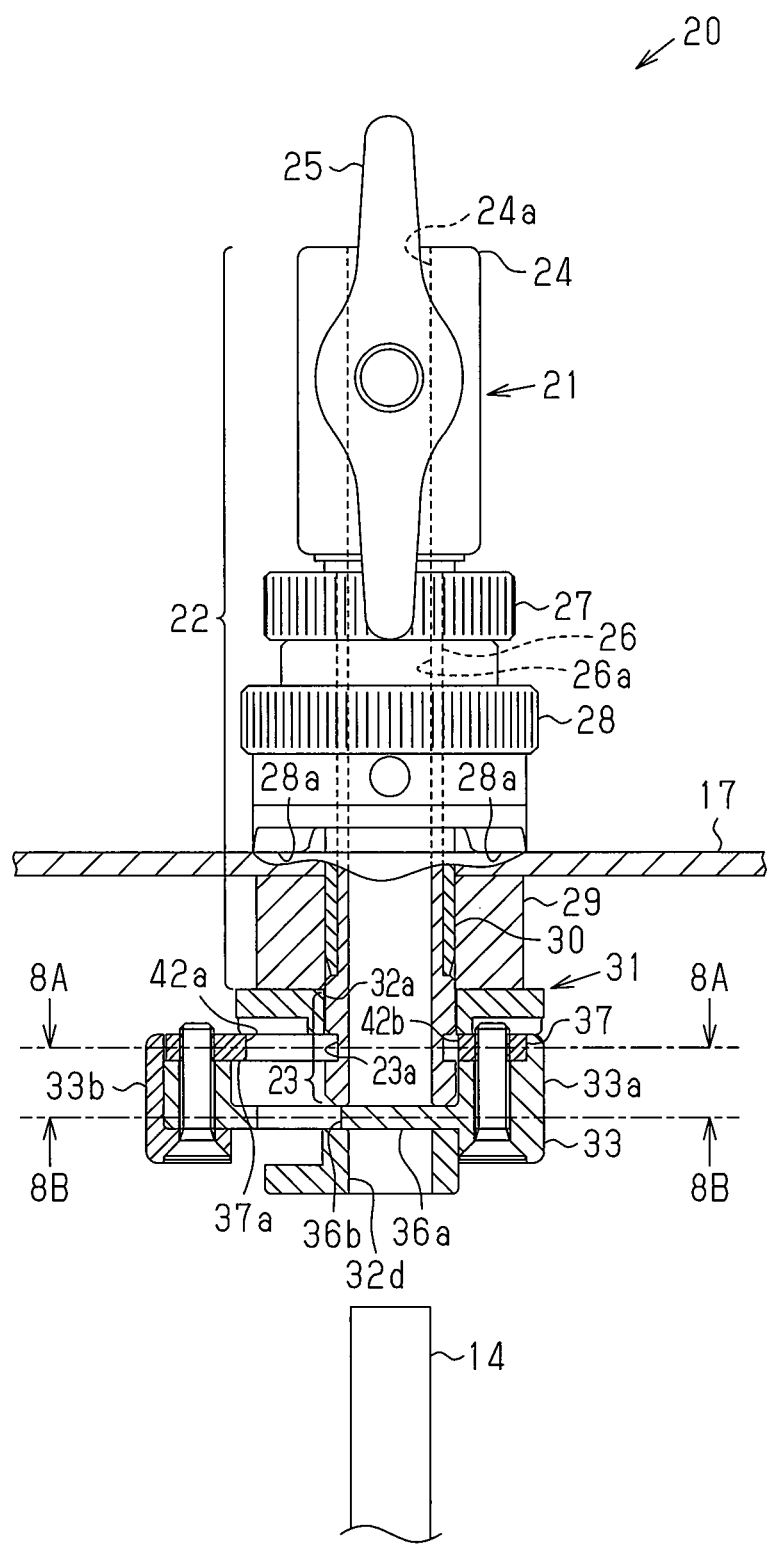
FIG. 7 is a partial cross-sectional view illustrating a disengagement state of the cymbal attachment.

With reference to FIGS. 2 and 3, the cymbal attachment 20 is configured by an attachment body 21 to which the rod 14 is fixed and a stopper assembly 31 arranged below the attachment body 21. The stopper assembly 31 is adapted to be attachable/detachable with respect to the attachment body 21. Referring to FIGS. 5 and 7, by mounting the stopper assembly 31 onto the attachment body 21, the top cymbal 17 is clamped and attached between the stopper assembly 31 and the attachment body 21.

The attachment body 21 includes an upper body 22 and a lower cylindrical body 23, which extends downward from the upper body 22. The upper body 22 includes a clutch body 24 having a fixing hole 24a to which the rod 14 is fixed, a wingnut 25 serving as a fixing means by which the rod 14 is fixed to the fixing hole 24a, and a hollow bolt 26 fixed to a lower section of the clutch body 24. The hollow bolt 26 has a hollow hole 26a, which communicates with the fixing hole 24a.

The upper body 22 also includes a lock nut 27 and a regulation nut 28, which are threaded onto the hollow bolt 26, and a felt 29 through which the hollow bolt 26 is inserted. The regulation nut 28, which serves as a regulation means, has a pair of projecting portions 28a held in point contact with an upper surface of the top cymbal 17. The regulation nut 28 is arranged to press the upper surface of the top cymbal 17 attached to the attachment body 21. The regulation nut 28 regulates swing of the top cymbal 17 by causing the two projecting portions 28a to contact the upper surface of the top cymbal 17. The lock nut 27, which serves as a lock means, locks the top cymbal 17 in a state pressed by the regulation nut 28.

The felt 29 is mounted onto an outer peripheral surface of the hollow bolt 26 through a cylindrical protection cover 30. The felt 29 is arranged between the top cymbal 17 and the stopper assembly 31. The felt 29 is pressed against a lower surface of the top cymbal 17 by means of the stopper assembly 31 mounted onto the attachment body 21. In this manner, by causing the upper surface of the felt 29 to contact the lower surface of the top cymbal 17, the felt 29 dampens vibration of the top cymbal 17.

The lower cylindrical body 23 is a section that includes a lower end of the hollow bolt 26 and projects downward from a central hole of the felt 29. The lower cylindrical body 23 thus configures a section of the hollow bolt 26 and extends coaxially with the fixing hole 24a, to which the rod 14 is fixed. The outer diameter of the lower cylindrical body 23 is smaller than the outer diameter of any of the lock nut 27, the regulation nut 28, the hollow bolt 26, and the felt 29, which configure the upper body 22. Also, the outer diameter of the lower cylindrical body 23 is set smaller than the inner diameter of an attachment hole of the top cymbal 17 to allow detachment of the top cymbal 17 from a distal end of the lower cylindrical body 23. Further, the inner diameter of the threaded hole of the lock nut 27 and the inner diameter of the threaded hole of the regulation nut 28 are each set greater than both the outer diameter of the lower cylindrical body 23 and the outer diameter of the protection cover 30 to allow detachment of the lock nut 27 or the regulation nut 28 from the lower cylindrical body 23 for replacement with a new nut.

An annular groove 23a is formed in an outer peripheral surface of the lower cylindrical body 23 as an engagement surface by which a stopper slider 33, which will be described later, is slid to become engaged with the attachment body 21. The annular groove 23a extends about the axis of the lower cylindrical body 23 and along the full circumference of the lower cylindrical body 23.

Figure 4:
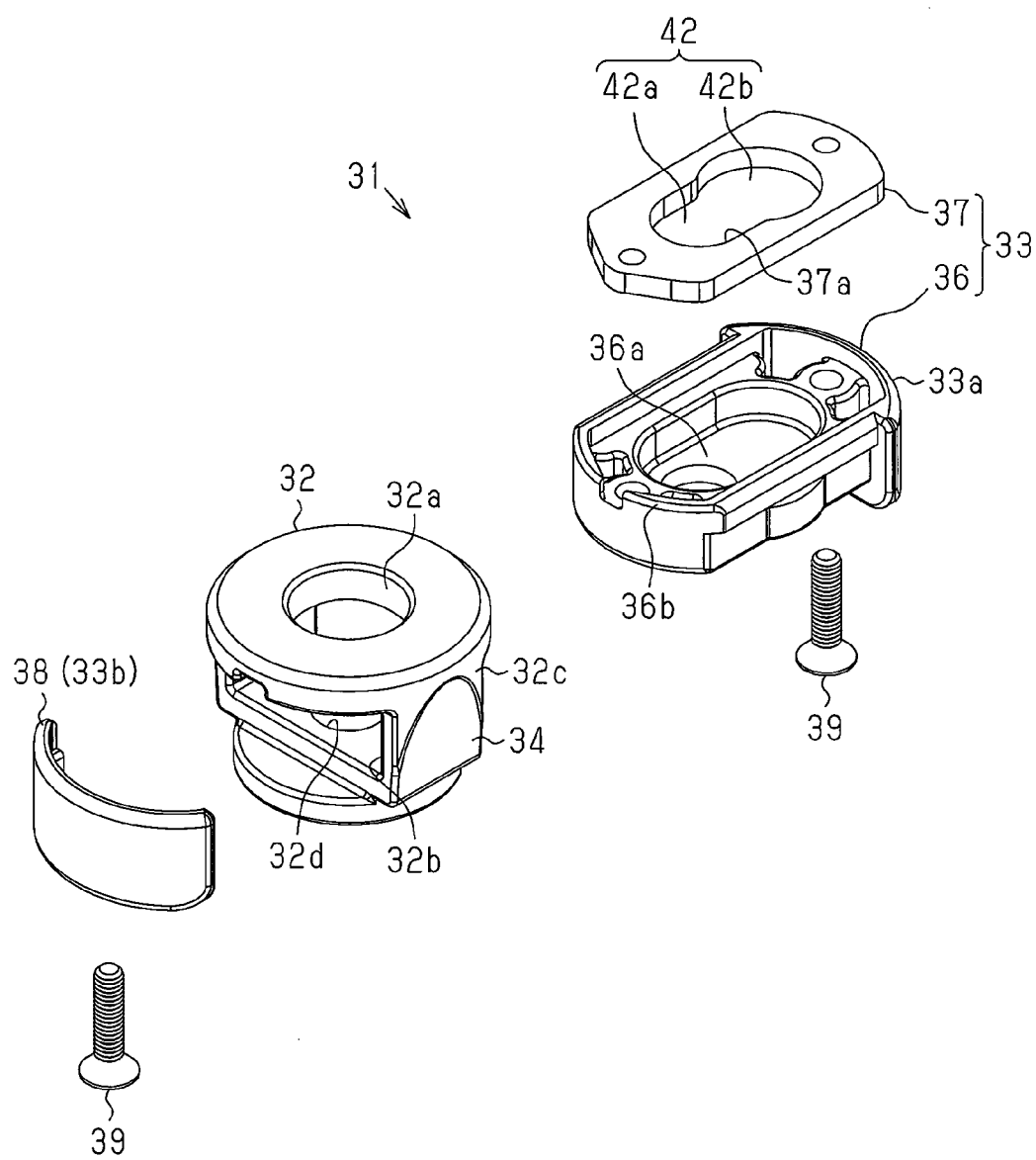
FIG. 4 is an exploded perspective view showing the stopper assembly.

As illustrated in FIGS. 2 to 4, the stopper assembly 31 includes a stopper holder 32 and the stopper slider 33, which is accommodated in the stopper holder 32. The stopper holder 32 is formed of plastic and shaped substantially cylindrical. The stopper holder 32 has an upper insertion hole 32a through which the lower cylindrical body 23 is inserted, an accommodation hole 32b that accommodates the stopper slider 33, and a lower insertion hole 32d through which the rod 14 is inserted. The upper insertion hole 32a is configured by a round hole formed in an upper wall of the stopper holder 32. The lower insertion hole 32d is configured by a round hole formed in a lower wall of the stopper holder 32. The accommodation hole 32b is a laterally elongated square hole surrounded by the upper wall, the lower wall, and a pair of side walls 32c of the stopper holder 32.

The stopper holder 32 supports the stopper slider 33 in a manner slidable in the accommodation hole 32b. In the present embodiment, inner surfaces of the upper wall, the lower wall, and the two side walls 32c of the stopper holder 32 are slide surfaces on which the stopper slider 33 slides. A flat section 34 is formed in an outer surface of each of the side walls 32c such that the stopper holder 32 is easily held by the fingers. Referring to FIGS. 6B and 8B, a projection 35 having an arcuate outer surface is projected from the inner surface of each side wall 32c.

As illustrated in FIG. 4, the stopper slider 33 includes a lower stopper 36, an upper plate 37, and a cover 38 fixed to an end surface of the lower stopper 36. The stopper slider 33 is configured by assembling the lower stopper 36, the upper plate 37, and the cover 38 integrally with one another using a pair of bolts 39.

The lower stopper 36 is formed of plastic and shaped like a box having a bottom. The lower stopper 36 has a length greater than the diameter of the stopper holder 32. A bottom section 36a of the lower stopper 36 configures a lower wall of the stopper slider 33. A round hole 36b, serving as a rod insertion recess through which the rod 14 is inserted, is formed in the bottom section 36a of the lower stopper 36. The round hole 36b is arranged at a position spaced from the middle of the bottom section 36a of the lower stopper 36.

The cover 38 is formed to have an arcuate cross section and shaped identically with one of opposite end surfaces of the lower stopper 36. The end surface of the lower stopper 36 forms a first end surface 33a of the stopper slider 33. The cover 38 is fixed to the other one of the opposite end surfaces of the lower stopper 36 to form a second end surface 33b of the stopper slider 33.

With reference to FIGS. 4, 6B, and 8B, projections 40 each having an arcuate outer surface are formed on corresponding opposite side surfaces of the lower stopper 36. The lower stopper 36 has spaces 41, which extend along the two side surfaces of the lower stopper 36, at backsides of the projections 40. Each of the side surfaces of the lower stopper 36 is formed to elastically flex about a point in the vicinity of the corresponding one of the projections 40 by means of the associated space 41. Each of the projections 40 of the lower stopper 36, together with the corresponding one of the projections 35 of the stopper holder 32, configure a clicking portion that generates clicking feeling when engagement between the stopper slider 33 and the attachment body 21 is complete.

Figure 6A:
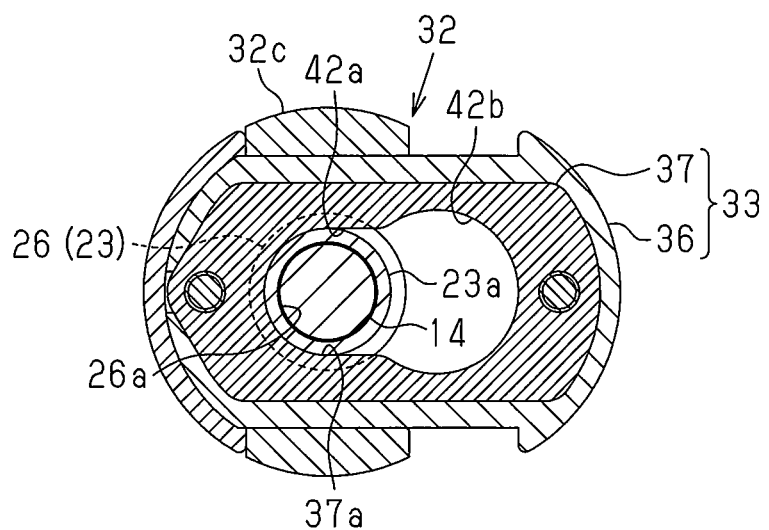
FIG. 6A is a cross-sectional view taken along line 6A-6A of FIG. 5.
Figure 6B:
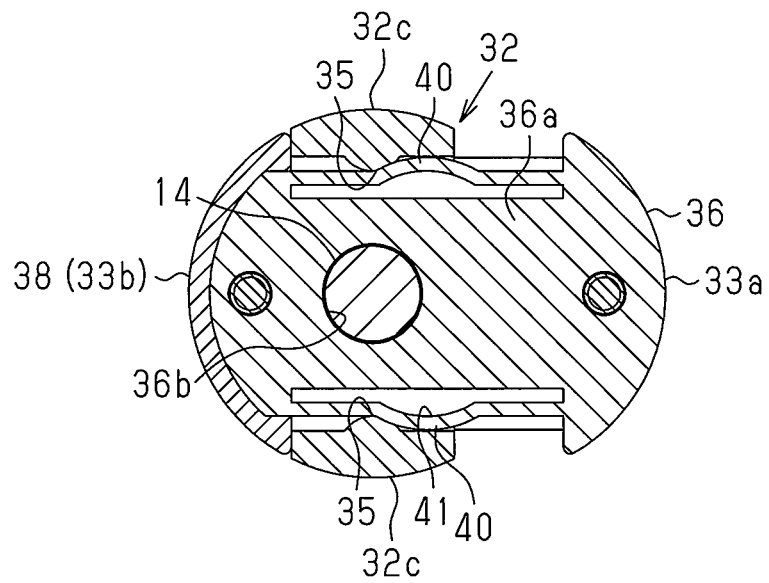
FIG. 6B is a cross-sectional view taken along line 6B-6B of FIG. 5.
Figure 8A:
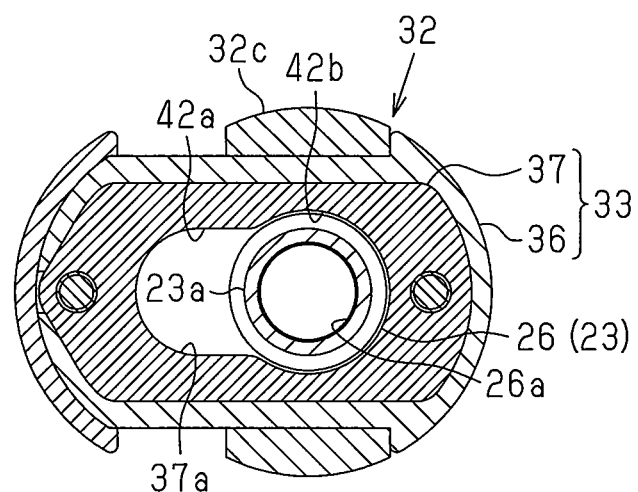
FIG. 8A is a cross-sectional view taken along line 8A-8A of FIG. 7.
Figure 8B:
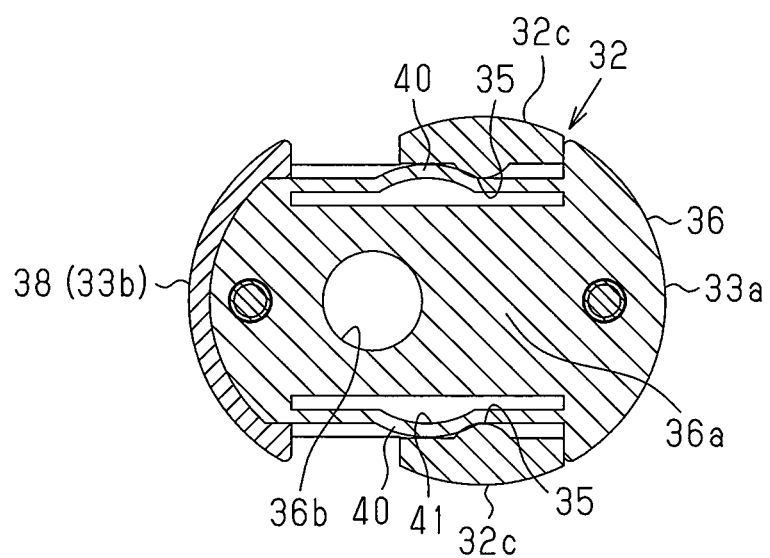
FIG. 8B is a cross-sectional view taken along line 8B-8B of FIG. 7.

As illustrated in FIGS. 4, 6A, and 8A, the upper plate 37 is formed of rigid metal and shaped to close the upper opening of the lower stopper 36. The upper plate 37 configures an upper wall of the stopper slider 33. A continuous hole 42, serving as an engagement recess with which the annular groove 23a of the lower cylindrical body 23 is engaged, is formed in the upper plate 37. The continuous hole 42 is configured by a single hole formed by joining a small-diameter hole 42a and a large-diameter hole 42b, which is greater in size than the small-diameter hole 42a, continuously from each other, and is substantially gourd-shaped.

The round hole 36b is arranged immediately below the small-diameter hole 42a. Not the round hole 36b but the bottom section 36a of the lower stopper 36 is located immediately below the large-diameter hole 42b. An engagement surface, by which the stopper slider 33 is engaged with the attachment body 21, is arranged in the upper plate 37. The engagement surface is an engagement edge section 37a, which serves as an edge section of the upper plate 37 that forms the small-diameter hole 42a. The thickness of the engagement edge section 37a of the upper plate 37 is set smaller than the width of the annular groove 23a.

Referring to FIGS. 5 and 7, to selectively attach and detach the stopper assembly 31 with respect to the attachment body 21, the stopped slider 33 is slid in the direction perpendicular to the axis of the fixing hole 24a. By sliding the stopper slider 33, as illustrated in FIGS. 6A and 8A, the engagement edge section 37a of the upper plate 37 is selectively engaged with and disengaged from the annular groove 23a of the lower cylindrical body 23.

Operation of the above-described cymbal attachment 20 will hereafter be described with reference to FIGS. 2, 3, and 5 to 8B. First, operation necessary for completing attachment of the top cymbal 17 to the rod 14 using the cymbal attachment 20 will be described. Attachment of the top cymbal 17 to the rod 14 involves a disengagement stage of the cymbal attachment 20 shown in FIGS. 3, 7, 8A, and 8B and an engagement stage of the cymbal attachment 20 shown in FIGS. 2, 5, 6A, and 6B.

At the disengagement stage of the cymbal attachment 20, as illustrated in FIG. 3, the cymbal attachment 20 is prepared in a state disassembled into the attachment body 21, the felt 29, and the stopper assembly 31. Then, the top cymbal 17, the felt 29, and the stopper assembly 31 are sequentially arranged around the lower cylindrical body 23 of the attachment body 21. By this time, in the stopper assembly 31, the stopper slider 33 has been switched to such a position that the first end surface 33a of the stopper slider 33 becomes flush with the outer peripheral surface of the stopper holder 32.

By the time the state of FIG. 3 is brought about, the stopper slider 33 has been switched to such a position that insertion of the lower cylindrical body 23 into the stopper assembly 31 is permitted and insertion of the rod 14 into the hollow hole 26a of the hollow bolt 26 is restricted. That is, with reference to FIGS. 7, 8A, and 8B, the large-diameter hole 42b of the continuous hole 42 is arranged at the position coinciding with the hollow hole 26a and the small-diameter hole 42a is arranged at a position spaced from the hollow hole 26a. As a result, the bottom section 36a of the lower stopper 36, which is immediately below the large-diameter hole 42b, is arranged at the position coinciding with the hollow hole 26a. Meanwhile, the round hole 36b, which is immediately below the small-diameter hole 42a, is arranged at the position spaced from the hollow hole 26a.

In this case, the lower cylindrical body 23 is inserted into the stopper assembly 31 until the lower cylindrical body 23 passes through the upper insertion hole 32a of the stopper holder 32 and the large-diameter hole 42b and comes into contact with the bottom section 36a of the lower stopper 36. In a state in which a lower end of the lower cylindrical body 23 is held in contact with the bottom section 36a of the lower stopper 36, the position of the annular groove 23a in the up-down direction substantially coincides with the position of the upper plate 37 in the up-down direction. Also, in this case, not the round hole 36b but the bottom section 36a of the lower stopper 36 is arranged at the position coinciding with the hollow hole 26a. The bottom section 36a of the lower stopper 36 thus restricts insertion of the rod 14 into the hollow hole 26a.

Subsequently, the cymbal attachment 20 is switched from the disengagement stage to the engagement stage. At the engagement stage of the cymbal attachment 20, referring to FIG. 2, the stopper slider 33 is switched to such a position that the second end surface 33b of the stopper slider 33 becomes flush with the outer peripheral surface of the stopper holder 32. At this time, the user holds the flat sections 34 of the stopper holder 32 and slides the stopper slider 33 in the direction perpendicular to the axis of the fixing hole 24a.

That is, as illustrated in FIGS. 5, 6A, and 6B, by sliding the stopper slider 33, the engagement edge section 37a of the upper plate 37 is engaged with the annular groove 23a of the lower cylindrical body 23. In this manner, the stopper slider 33 becomes engaged with the lower cylindrical body 23 such that the top cymbal 17 is clamped and attached between the stopper assembly 31 and the attachment body 21.

At this time, when the engagement edge section 37a becomes engaged with the annular groove 23a, the user can perceive clicking feeling. With reference to FIGS. 6B and 8B, the clicking feeling is generated when the projections 40 of the stopper slider 33 proceed beyond the corresponding projections 35 of the stopper holder 32. By means of the clicking feeling caused by the projections 35, 40, the user can acknowledge completion of engagement between the stopper slider 33 and the attachment body 21.

By the time the state shown in FIG. 2 is brought about, the stopper slider 33 has been switched to such a position that insertion of the rod 14 into the hollow hole 26a is permitted. That is, as illustrated in FIGS. 5, 6A, and 6B, the small-diameter hole 42a of the continuous hole 42 is arranged at the position coinciding with the hollow hole 26a and the large-diameter hole 42b is arranged at a position spaced from the hollow hole 26a. In this case, the bottom section 36a of the lower stopper 36, which is immediately below the large-diameter hole 42b, is arranged at the position spaced from the hollow hole 26a. Meanwhile, the round hole 36b, which is immediately below the small-diameter hole 42a, is arranged at the position coinciding with the hollow hole 26a. The round hole 36b thus permits insertion of the rod 14 into the hollow hole 26a.

After being inserted through the hollow hole 26a and the fixing hole 24a sequentially from the lower insertion hole 32d and the round hole 36b, the rod 14 is fixed to the fixing hole 24a of the attachment body 21 using the wingnut 25. At the time point at which insertion of the rod 14 through the round hole 36b is complete, slide of the stopper slider 33 is restricted and engagement between the attachment body 21 and the stopper slider 33 is maintained. To detach the top cymbal 17, the wingnut 25 is loosened and the rod 14 is drawn out of the fixing hole 24a. The stopper slider 33 is then slid in the direction opposite to the direction for attaching the top cymbal 17.

The present embodiment has the advantages described below.

(1) The engagement surface by which the stopper slider 33 is engaged with the attachment body 21 are arranged in both the lower cylindrical body 23 and the upper plate 37. Also, the continuous hole 24, with which the annular groove 23a of the lower cylindrical body 23 is engaged, is formed in the upper plate 37. The round hole 36b, through which the rod 14 is inserted, is formed in the bottom section 36a of the lower stopper 36. In this configuration, by sliding the stopper slider 33 with respect to the attachment body 21, the attachment body 21 and the stopper slider 33 are engaged with each other by means of the engagement surface. Then, by inserting the rod 14 through the hollow hole 26a and the fixing hole 24a sequentially from the lower insertion hole 32d and the round hole 36b, the rod 14 is caused to restrict slide of the stopper slider 33. In other words, simply by sliding the stopper slider 33 and inserting the rod 14 from the round hole 36b, the stopper assembly 31 is mounted onto the attachment body 21 and the top cymbal 17 is attached between the stopper assembly 31 and the attachment body 21. In this manner, by sliding the stopper slider 33 and selectively inserting and separating the rod 14, the top cymbal 17 is easily attached or detached. Further, unlike the conventional thread type cymbal attachment, the attachment state of the cymbal does not change due to loosening of a thread. As a result, the cymbal is maintained in a desirable attachment state even when the cymbal is played.

(2) The round hole 36b, through which the rod 14 is inserted, is formed in the bottom section 36a of the lower stopper 36. In this configuration, unless the round hole 36b is arranged coaxially with the continuous hole 42 and the fixing hole 24a, the rod 14 is prohibited from being inserted through the continuous hole 42 and the fixing hole 24a from the round hole 36b. That is, unless the stopper slider 33 is engaged with the attachment body 21, attachment of the top cymbal 17 is prohibited. This ensures further reliable attachment of the top cymbal 17.

(3) The engagement surface of the attachment body 21 is the annular groove 23a of the lower cylindrical body 23. The engagement surface of the stopper slider 33 is the engagement edge section 37a, which serves as the edge section of the upper plate 37 that forms the small-diameter hole 42a. In this configuration, by engaging the engagement edge section 37a with the annular groove 23a, engagement between the attachment body 21 and the stopper slider 33 is reliably accomplished. Also, in this case, the engagement surfaces are formed simply by drilling a hole in the upper plate 37 and forming a groove in the outer peripheral surface of the lower cylindrical body 23. This maximally restrains shape complication caused by forming the respective engagement surface in the attachment body 21 and the stopper slider 33.

(4) The annular groove 23a extends about the axis of the lower cylindrical body 23 and along the full circumference of the lower cylindrical body 23. In this configuration, regardless of the position about the axis of the attachment body 21, the stopper slider 33 is engaged with the attachment body 21. Further, the annular groove 23a is formed in the outer peripheral surface of the lower cylindrical body 23, which has an outer diameter smaller than that of the upper body 22. This ensures a compact shape of the cymbal attachment 20 when the stopper slider 33 is mounted onto the attachment body 21.

(5) In the state in which the lower end of the lower cylindrical body 23 is held in contact with the bottom section 36a of the lower stopper 36, the position of the annular groove 23a in the up-down direction coincides with the position of the upper plate 37 in the up-down direction. In this configuration, the annular groove 23a and the engagement edge section 37a of the upper plate 37 are positioned with respect to each other in the up-down direction by causing contact between the lower end of the lower cylindrical body 23 and the bottom section 36a of the lower stopper 36. Engagement between the attachment body 21 and the stopper slider 33 is thus further reliably accomplished. Also, in this case, the width of the annular groove 23a is greater than the thickness of the engagement edge section 37a of the upper plate 37. As a result, by sliding the stopper slider 33, the engagement edge section 37a of the upper plate 37 is smoothly engaged with the annular groove 23a of the lower cylindrical body 23. This ensures further quick engagement between the attachment body 21 and the stopper slider 33.

(6) The projections 35, each of which has an arcuate outer surface, are formed on the corresponding two side walls 32c of the stopper holder 32. Correspondingly, the projections 40, each of which has an arcuate outer surface, are formed on the corresponding two side surfaces of the lower stopper 36. In this configuration, when the engagement edge section 37a is engaged with the annular groove 23a, the user can perceive the clicking feeling as the projections 40 of the stopper slider 33 proceed beyond the corresponding projections 35 of the stopper holder 32. This allows the user to acknowledge completion of engagement between the stopper slider 33 and the attachment body 21. As a result, before inserting the rod 14 through the fixing hole 24a, the user can reliably engage the stopper slider 33 with the attachment body 21. Also, using the projections 35 of the stopper holder 32 and the projections 40 of the stopper slider 33, the stopper assembly 31 can be temporarily fixed to the attachment body 21. In this manner, after the top cymbal 17 is attached to the cymbal attachment 20 and before the cymbal attachment 20 is fixed to the rod 14, the stopper assembly 31 is stopped from separating from the attachment body 21.

(7) Each of the two side surfaces of the lower stopper 36 is formed to elastically flex about a point in the vicinity of the corresponding one of the projections 40 by means of the associated space 41. Also, each of the projections 40 of the lower stopper 36, together with the corresponding one of the projections 35 of the stopper holder 32, configures the clicking portion that generates the clicking feeling when engagement between the stopper slider 33 and the attachment body 21 is complete. This allows the user to obtain a desirable clicking feeling caused by elastic force while sliding the stopper slider 33 to engage the engagement edge section 37a with the annular groove 23a. Further, since the engagement edge section 37a of the upper plate 37 is formed of metal and has rigidity, engagement force between the attachment body 21 and the stopper slider 33 is ensured.

(8) The felt 29 is arranged between the top cymbal 17 and the stopper assembly 31. The stopper holder 32 supports the stopper slider 33 in a manner slidable in the accommodation hole 32b. In this configuration, even if the top cymbal 17 is repeatedly attached or detached, the stopper slider 33 does not contact the felt 29 directly. Wear of a surface of the felt 29 caused by the stopper slider 33 is thus avoided. Also, the stopper holder 32 is formed of plastic having self-lubricating property. This decreases sliding resistance of the stopper slider 33 with respect to the stopper holder 32. The stopper slider 33 is thus slid smoothly.

(9) The attachment body 21 also includes the lock nut 27 and the regulation nut 28, which are threaded onto the hollow bolt. In this configuration, the regulation nut 28 regulates swing of the top cymbal 17 to an appropriate level. Also, even when the cymbal is played, the lock nut 27 maintains the swing of the top cymbal 17 at the appropriate level.

The present embodiment may be modified to the forms described below.

Figure 9A:
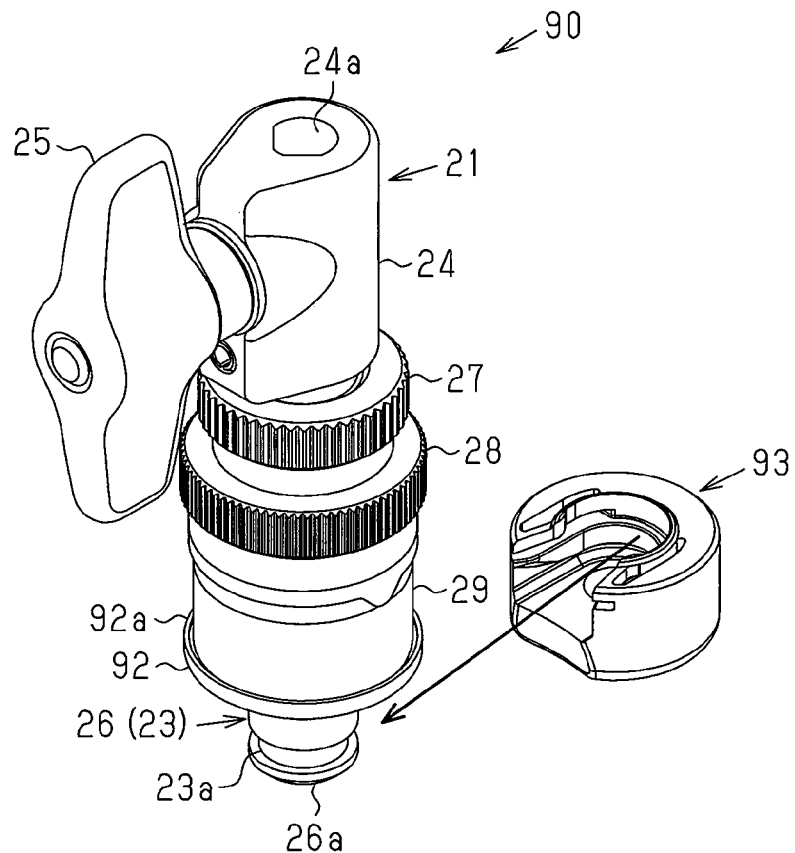
FIG. 9A is a perspective view showing a cymbal attachment of another example.
Figure 9B:
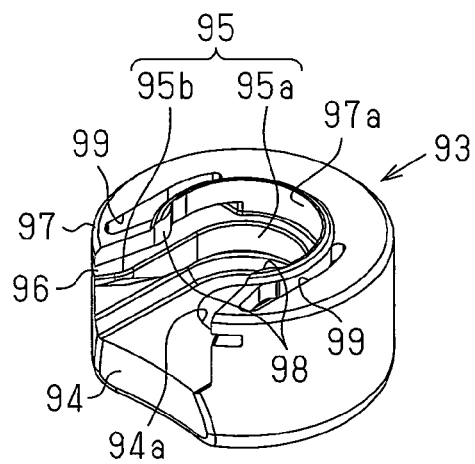
FIG. 9B is a perspective view showing a stopper slider.

A cymbal attachment 90, which is shown in FIGS. 9A and 9B, may be employed. Specifically, the substantially cylindrical stopper holder 32, which is shown in FIGS. 3 and 4, is replaced by a circular plate-like retainer 92. Also, the stopper slider 33, which is shown in FIGS. 2 and 3, is replaced by a stopper slider 93 shaped substantially cylindrical with a bottom. As illustrated in FIG. 9A, the retainer 92 has a projected portion 92a, which extends along the outer peripheral edge of the retainer 92. By fitting a lower section of the felt 29 inside the projected portion 92a, the retainer 92 is attached to the felt 29. In this case, a lower surface of the retainer 92 is a slide surface on which the stopper slider 93 slides.

The stopper slider 93 has a bottom wall 94 in which a round hole 94a serving as a rod insertion recess is formed. The stopper slider 93 also has a middle wall 96 in which a continuous recess 95 serving as an engagement recess is formed. The continuous recess 95 is a single recess formed by joining an engagement recess 95a, serving as an engagement surface, to an opening recess 95b, which has a width greater than the engagement recess 95a. The engagement recess 95a is arranged immediately above the round hole 94a and the opening recess 95b is arranged at a position spaced from the round hole 94a. Also, the stopper slider 93 has an upper wall 97 having a recess 97a shaped substantially identical with the continuous recess 95. The section of the upper wall 97 in the vicinity of the opening is formed to elastically flex by means of a pair of projections 98 and a pair of spaces 99.

As represented by the arrow in FIG. 9A, by sliding the stopper slider 93 with respect to the attachment body 21, the engagement recess 95a of the stopper slider 93 is engaged with the annular groove 23a of the lower cylindrical body 23. In this state, by inserting the rod 14 through the hollow hole 26a of the hollow bolt 26 from the round hole 94a of the stopper slider 93, slide of the stopper slider 93 is restricted. As a result, even in this configuration, simply by sliding the stopper slider 93 and inserting the rod 14 from the round hole 94a, the stopper slider 93 is mounted onto the attachment body 21 to attach the top cymbal 17.

Figure 10A:
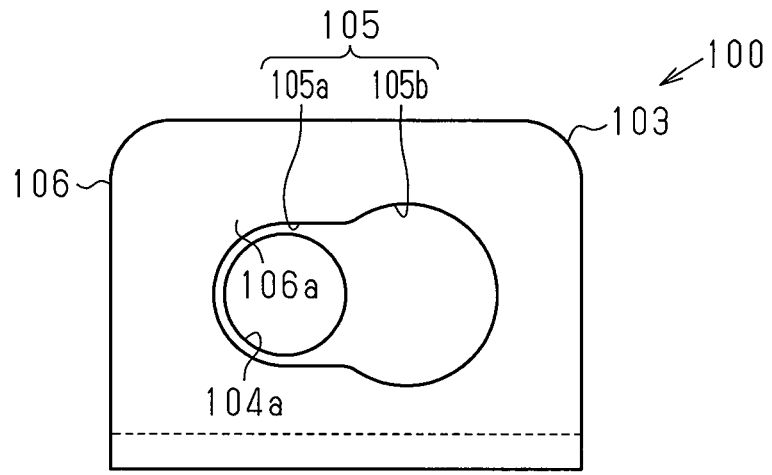
FIG. 10A is a top view showing a cymbal attachment of another example.
Figure 10B:
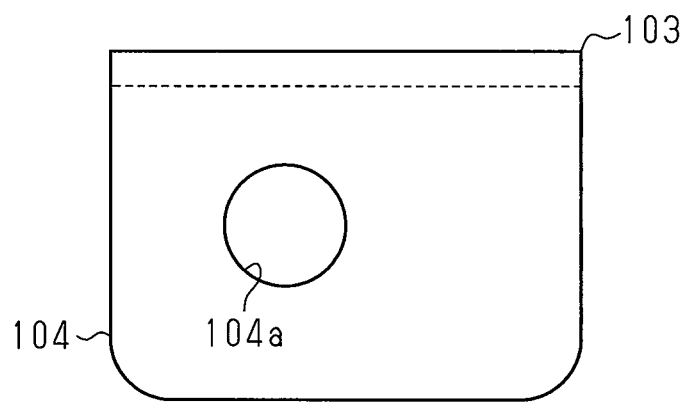
FIG. 10B is a bottom view showing the cymbal attachment.
Figure 10C:
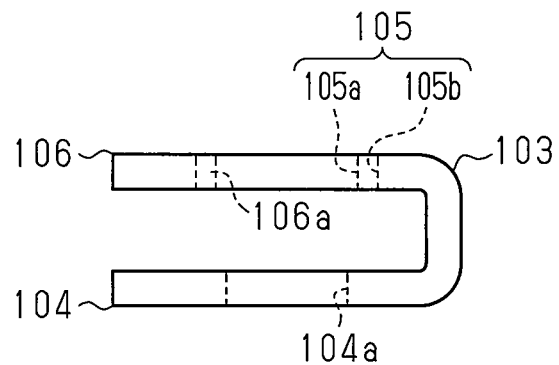
FIG. 10C is a side view showing the cymbal attachment.

A cymbal attachment 100, which is shown in FIGS. 10A, 10B, and 10C, may be employed. Specifically, the substantially cylindrical stopper holder 32, which is shown in FIGS. 3 and 4, is omitted. Also, the stopper slider 33, which is shown in FIGS. 2 and 3, is replaced by a stopper slider 103 having a U-shaped cross section. The stopper slider 103 is formed by drilling a hole in a rigid metal plate and pressing the plate in a predetermined shape.

With reference to FIGS. 10A to 10C, the stopper slider 103 has a lower wall 104 in which a round hole 104a serving as a rod insertion recess is formed. The stopper slider 103 also has an upper wall 106 in which a continuous hole 105 serving as an engagement recess is formed. The continuous hole 105 is a single hole formed by joining a small-diameter hole 105a to a large-diameter hole 105b, which is greater in size than the small-diameter hole 105a. The small-diameter hole 105a is arranged immediately above the round hole 104a. The large-diameter hole 105b is arranged at a position spaced from the round hole 104a. The engagement surface of the stopper slider 103 is an engagement edge section 106a, which serves as an edge section of the upper wall 106 that forms the small-diameter hole 105a.

In this configuration, by sliding the stopper slider 103 with respect to the attachment body 21, the engagement edge section 106a of the stopper slider 103 is engaged with the annular groove 23a of the lower cylindrical body 23. In this state, by inserting the rod 14 through the hollow hole 26a, which is shown in FIGS. 3 and 9, from the round hole 104a of the stopper slider 103, slide of the stopper slider 103 is restricted. As a result, even in this configuration, simply by sliding the stopper slider 103 and inserting the rod 14 from the round hole 104a, the stopper slider 103 is mounted onto the attachment body 21 to attach the top cymbal 17.

Figure 11A:
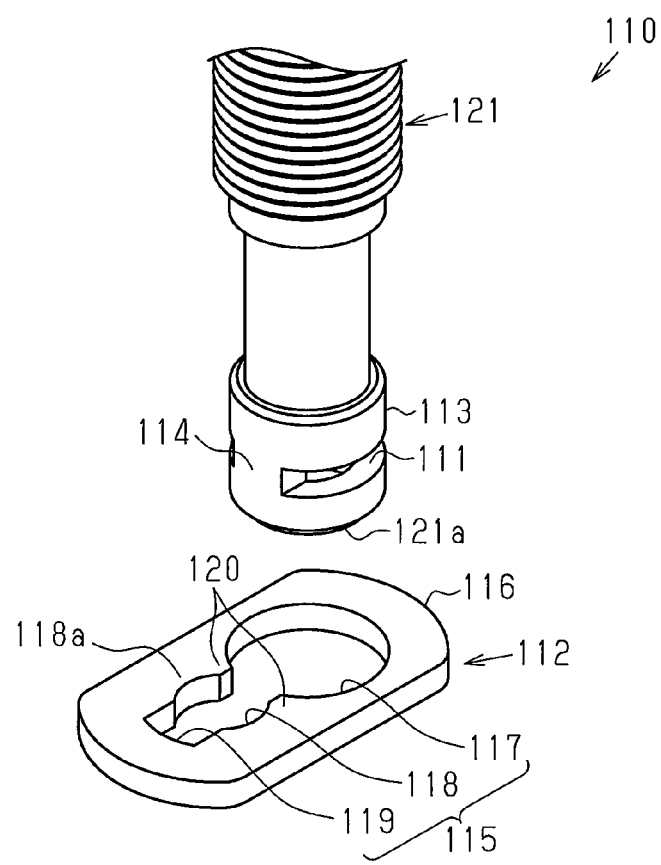
FIG. 11A is a perspective view illustrating a portion of a cymbal attachment of another example in a disengagement state.
Figure 11B:
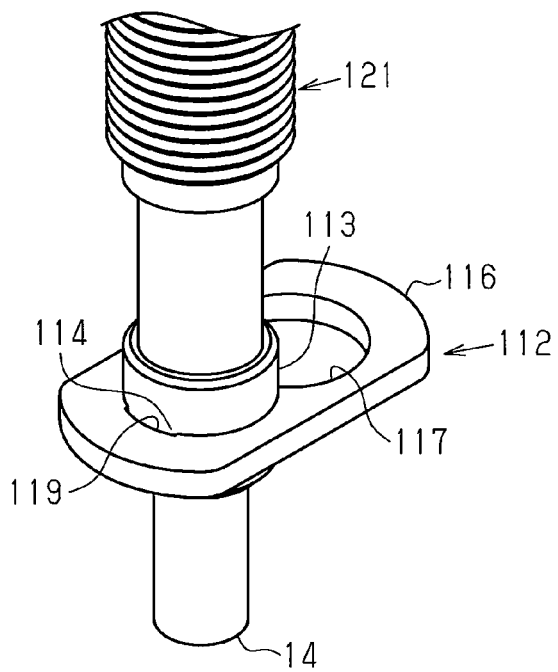
FIG. 11B is a perspective view illustrating the portion of the cymbal attachment in an engagement state.

A cymbal attachment 110, which is shown in FIGS. 11A and 11B, may be employed. Specifically, the substantially cylindrical stopper holder 32, which is shown in FIGS. 3 and 4, is omitted. Also, the annular groove 23a of the lower cylindrical body 23 is replaced by a C groove 111 and the stopper slider 33, which is shown in FIGS. 2 and 3, is replaced by a flat stopper slider 112. Referring to FIGS. 11A and 11B, the C groove 111, serving as an engagement surface, and a non-groove portion 114, which is located between opposite end sections of the C groove 111, are arranged in an outer peripheral surface of a lower cylindrical body 113. The stopper slider 112 is formed by punching a rigid metal plate in a predetermined shape and drilling a hole in the plate.

The stopper slider 112 is configured by a plate body 116 in which a substantially gourd-shaped continuous hole 115 is formed. The continuous hole 115 is configured by a large-diameter hole 117 through which a distal end of the lower cylindrical body 113 is inserted, a small-diameter hole 118 serving as a rod insertion recess, and a square groove 119 in which the non-groove portion 114 of the lower cylindrical body 113 is fitted. The engagement surface of the stopper slider 112 is an engagement edge section 118a, which serves as an edge section of the plate body 116 that forms the small-diameter hole 118. The plate body 116 has a pair of restricting portions 120 between the large-diameter hole 117 and the small-diameter hole 118. The two restricting portions 120 restrict movement of the rod 14 from the small-diameter hole 118 to the large-diameter hole 117.

In this configuration, by sliding the stopper slider 112 with respect to the attachment body, the engagement edge section 118a of the stopper slider 112 is engaged with the C groove 111 of the lower cylindrical body 113. Meanwhile, the non-groove portion 114 of the lower cylindrical body 113 is fitted in the square groove 119 of the stopper slider 112. In this state, by inserting the rod 14 through a hollow hole 121a of a hollow bolt 121 from the small-diameter hole 118 of the stopper slider 112, the rod 14 is caused to restrict slide of the stopper slider 112. As a result, even in this configuration, simply by sliding the stopper slider 112 and inserting the rod 14 from the small-diameter hole 118, the stopper slider 112 is mounted onto the attachment body to attach the top cymbal 17.

The cymbal attachment 20 may be employed with the round hole 36b and the continuous hole 42 located at the reverse positions. Specifically, the cymbal attachment 20 may be reversed in the up-down direction from the state shown in FIG. 2 and used with the stopper assembly 31 facing upward and the clutch body 24 facing downward. In this case, the top cymbal 17 is attached between the stopper assembly 31 and the attachment body 21 before the rod 14 is inserted from the fixing hole 24a of the clutch body 24. Then, the wingnut 25 is manipulated to fix the rod 14 to the fixing hole 24a.

Although the rod insertion recess is the round hole 36b, the rod insertion recess may be modified to a polygonal hole or recess as long as the rod insertion recess is shaped such that the rod 14 is inserted through the rod insertion recess.

Although the engagement surface of the attachment body 21 is the annular groove 23a, which is arranged in the outer peripheral surface of the lower cylindrical body 23, the engagement surface may be modified to a projecting portion. In this case, a recess engageable with the projecting portion of the attachment body 21 may be arranged in the stopper slider 33 as an engagement surface.

The lower cylindrical body 23 may have an outer diameter that is equal to or greater than the lock nut 27, the regulation nut 28, the hollow bolt 26, and the felt 29, which configure the upper body 22.

In the state in which the lower end of the lower cylindrical body 23 is held in contact with the bottom section 36a of the lower stopper 36, the position of the annular groove 23a in the up-down direction does not necessarily have to coincide with the position of the upper plate 37 in the up-down direction. For example, after causing the lower end of the lower cylindrical body 23 to contact the bottom section 36a of the lower stopper 36, the stopper assembly 31 may be raised slightly and pressed against the felt 29 to cause the position of the annular groove 23a in the up-down direction to coincide with the position of the upper plate 37 in the up-down direction.

The projections 35, 40 may be omitted from the stopper assembly 31.

The lower stopper 36 may be formed of rigid metal. In this case, to allow the sections of the lower stopper 36 in the vicinities of the projections 35 to elastically flex, space may be arranged at the backside of each projection 35 of the lower stopper 36.

The regulation nut 28 and the lock nut 27 may be omitted from the attachment body 21. The attachment body 21 may be configured in any suitable manner as long as the attachment body 21 has at least the fixing hole 24a, to which the rod 14 is fixed, and a section with which the stopper slider 33 is engaged.

The cymbal attachment 20 may be employed in not only the hi-hat stand 10 but also a cymbal stand.

The invention claimed is:

1. A cymbal attachment adapted to attach a cymbal to a rod, the cymbal attachment comprising:
   an attachment body having a fixing hole to which the rod is fixed and a hollow hole through which the rod is inserted, the hollow hole communicating with the fixing hole; and
   a stopper that is mounted onto the attachment body to attach the cymbal to the attachment body, wherein
   the stopper has a rod insertion recess through which the rod is inserted, the rod insertion recess having an inner circumferential surface that is adapted to contact an outer circumferential surface of the rod,
   an engagement surface by which the stopper is engaged with the attachment body by sliding the stopper in a direction perpendicular to an axis of the fixing hole is arranged in both the attachment body and the stopper, and
   in a state in which the stopper is engaged with the attachment body and the rod is inserted through the rod insertion recess and the hollow hole, the outer circumferential surface of the rod, which comes in contact with the inner circumferential surface of the rod insertion recess, restricts sliding of the stopper so that the attachment body and the stopper are maintained in engagement; wherein the rod is positioned coaxially with a center axis of the attachment body and the stopper.

2. The cymbal attachment according to claim 1, wherein the stopper also has an engagement recess with which the engagement surface of the attachment body is engaged.

3. The cymbal attachment according to claim 1, wherein the rod insertion recess is a hole.

4. The cymbal attachment according to claim 2, wherein
   the stopper has a lower wall having the rod insertion recess and an upper wall having the engagement recess,
   the engagement surface of the stopper is configured by an edge section of the upper wall that forms the engagement recess, and
   the engagement surface of the attachment body is a groove formed in an outer surface of the attachment body.

5. The cymbal attachment according to claim 4, wherein, the attachment body includes:
   an upper body having the fixing hole and a fixing means by which the rod is fixed to the fixing hole; and
   a lower cylindrical body extending from a lower surface of the upper body coaxially with the fixing hole, and the groove is configured by an annular groove that is formed in an outer peripheral surface of the lower cylindrical body and extends about an axis of the lower cylindrical body.

6. The cymbal attachment according to claim 4, wherein a position of the engagement surface of the attachment body in an up-down direction coincides with a position of the engagement surface of the stopper in the up-down direction in a state in which a lower end of the attachment body is held in contact with the lower wall of the stopper.

7. The cymbal attachment according to claim 1, wherein a clicking portion that generates a clicking feeling when engagement with the attachment body is complete is arranged in the stopper.

8. The cymbal attachment according to claim 7, wherein the clicking portion of the stopper is elastic, and an upper wall of the stopper is rigid.

9. The cymbal attachment according to claim 1, further comprising a holder that is arranged in a lower section of the attachment body and has a slide surface on which the stopper slides.

10. The cymbal attachment according to claim 1, wherein the attachment body includes a regulation means by which swing of the cymbal attached to the attachment body is regulated by pressing the cymbal from above and a lock means by which pressing of the cymbal by the regulation means is locked.

11. A hi-hat stand comprising:
a stand body;
a foot pedal manipulated to play a cymbal;
a rod that is selectively lifted and lowered by depressing the foot pedal; and
a cymbal attachment adapted to attach the cymbal to the rod, wherein
the cymbal attachment includes:
an attachment body having a fixing hole to which the rod is fixed and a hollow hole through which the rod is inserted, the hollow hole communicating with the fixing hole; and
a stopper mounted onto the attachment body to attach the cymbal to the attachment body,
the stopper has a rod insertion recess through which the rod is inserted, the rod insertion recess having an inner circumferential surface that is adapted to contact an outer circumferential surface of the rod,
an engagement surface by which the stopper is engaged with the attachment body by sliding the stopper in a direction perpendicular to an axis of the fixing hole is arranged in both the attachment body and the stopper, and
in a state in which the stopper is engaged with the attachment body and the rod is inserted through the rod insertion recess and the hollow hole, the outer circumferential surface of the rod, which comes in contact with the inner circumferential surface of the rod insertion recess, restricts sliding of the stopper so that the attachment body and the stopper are maintained in engagement; wherein the rod is positioned coaxially with a center axis of the attachment body and the stopper.

* * * * *